W. J. BOYER.
GRIP CHAIN FOR TIRES.
APPLICATION FILED AUG. 24, 1915.

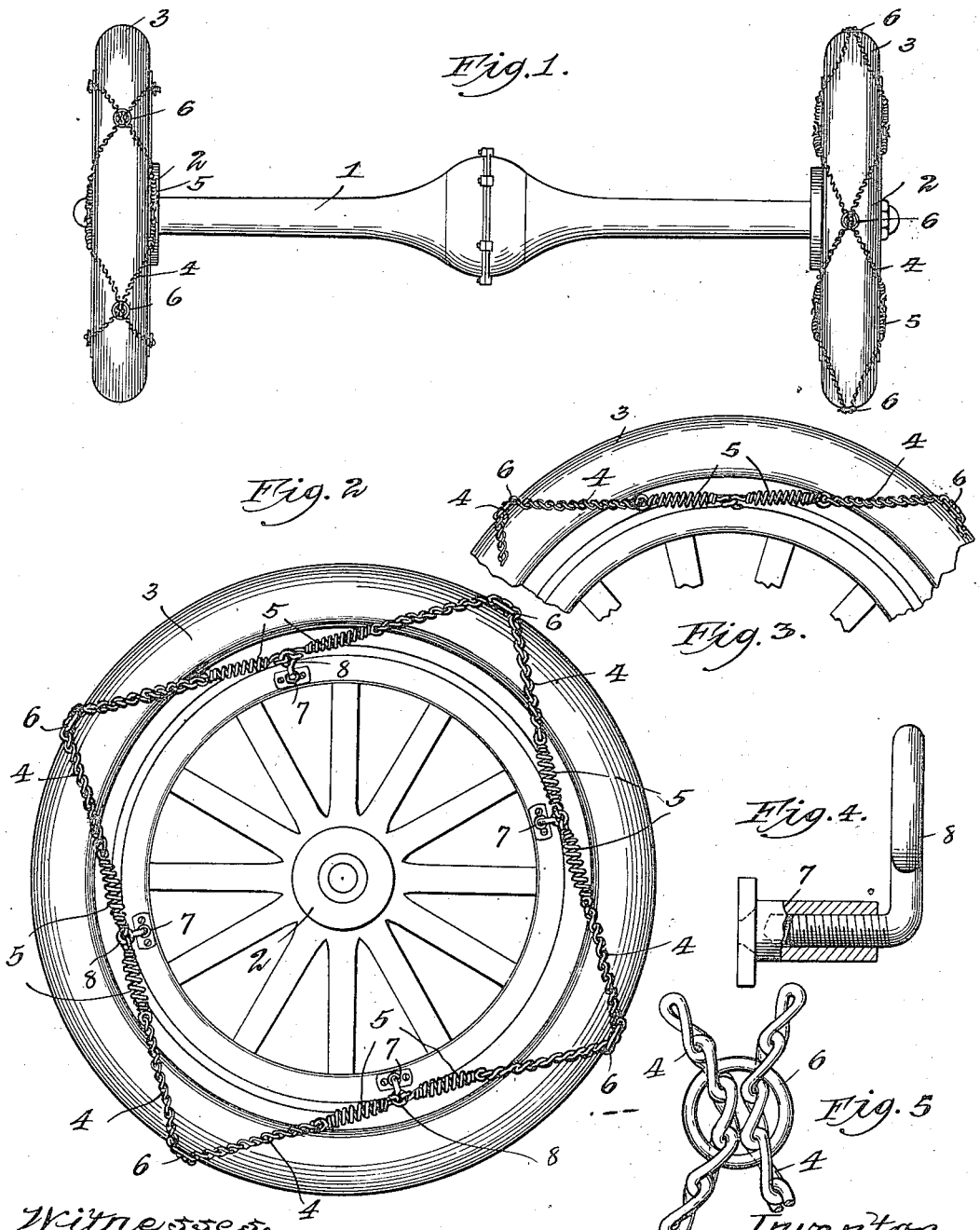

1,254,023.

Patented Jan. 22, 1918.
3 SHEETS—SHEET 2.

Witnesses,

Inventor,
William J. Boyer

W. J. BOYER.
GRIP CHAIN FOR TIRES.
APPLICATION FILED AUG. 24, 1915.
1,254,023.
Patented Jan. 22, 1918.
3 SHEETS—SHEET 3.
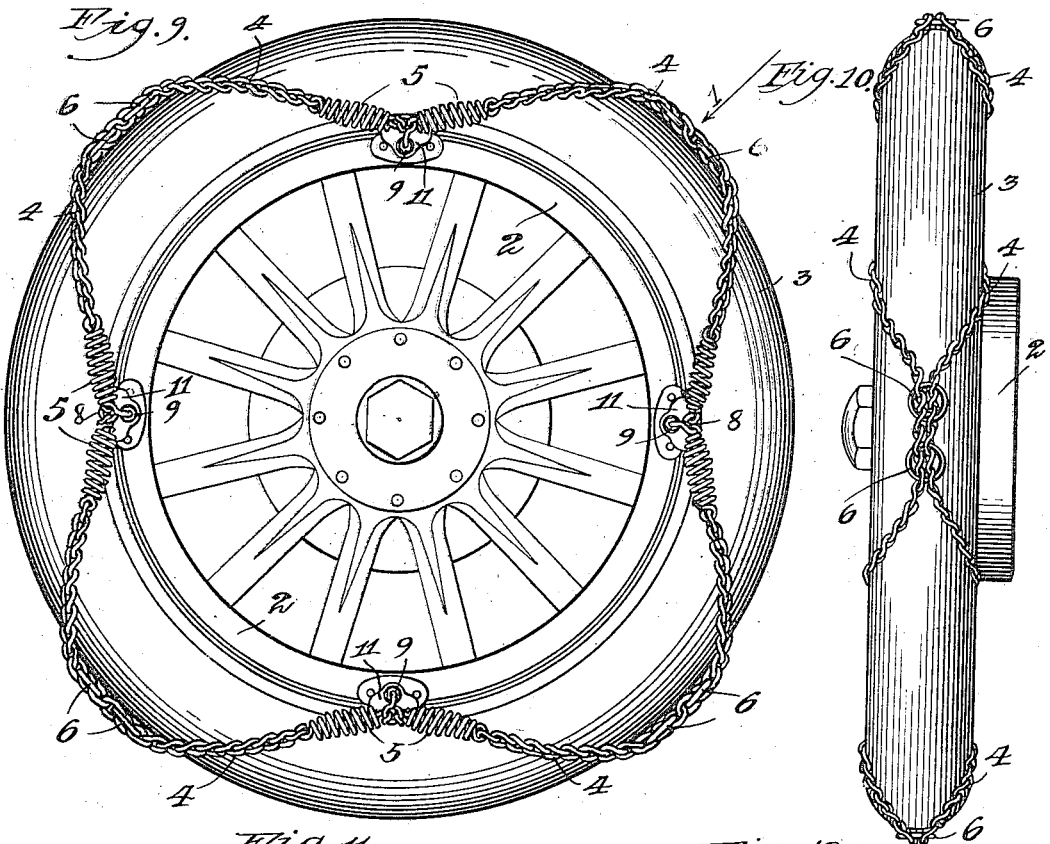
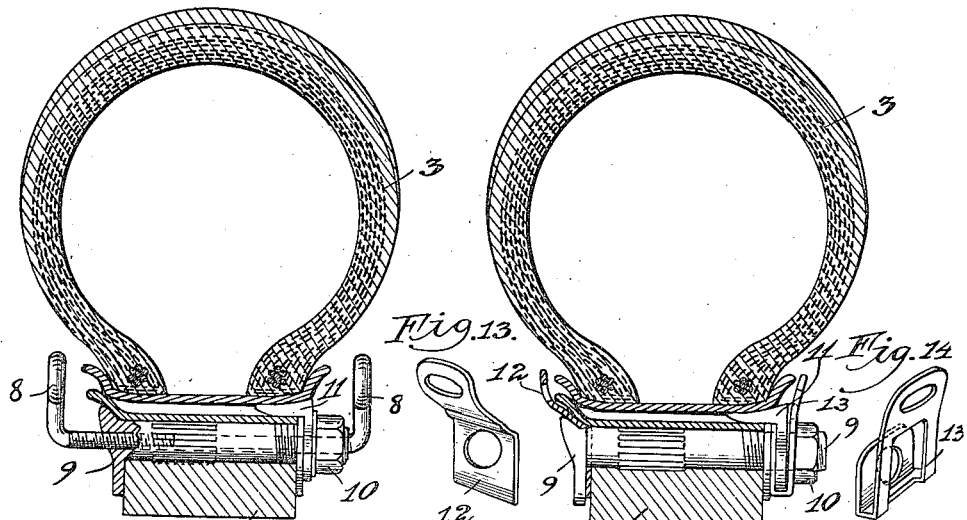

UNITED STATES PATENT OFFICE.

WILLIAM J. BOYER, OF CHICAGO, ILLINOIS.

GRIP-CHAIN FOR TIRES.

1,254,023.

Specification of Letters Patent. Patented Jan. 22, 1918.

Application filed August 24, 1915. Serial No. 47,185.

*To all whom it may concern:*

Be it known that I, WILLIAM J. BOYER, of Chicago, in the county of Cook, in the State of Illinois, have invented new and useful Improvements in Grip-Chains for Tires, of which the following, taken in connection with the accompanying drawings, is a full, clear, and exact description.

This invention relates to improvements in treads for pneumatic or solid rubber tires, and is particularly applicable for use on the driving-wheels of automobiles to prevent the tire from slipping or skidding on slippery pavements, and also to give better traction to the wheels when starting the automobile, and thereby preventing the wheels from spinning around, as is often the case when other devices are used. My improvements may also be used to great advantage on the front wheels wherever the streets are very slippery and covered with ice or snow.

The object of my present invention is to provide a sectional and flexible grip or tread composed of chains, springs, connecting rings and fastenings, all linked together and applied to the periphery of the tire and sides of the wheel felly or to the rim, as the case may require, and held tightly to the tire by the means of the springs.

These grip chains or treads are adapted to be applied either to the driving wheels of an automobile, or both, as conditions may require, and one of the important objects is to enable anyone to easily and almost instantly apply the several sections composing these grip chains or treads by merely hooking the ends of the springs into the screw eyes or other fastenings, at the sides of the wheels toward the vehicle, and then stretching the chains over the tire toward the side of the wheel away from the vehicle and fastening the hooks at the other ends of the springs to the screw eyes or other fastenings on the side of the wheel away from the vehicle.

Another object in constructing these grip chains or treads in sectional form is to provide a means for their application without the necessity of jacking up the car, and at the same time automatically take up the slack and permit the grip chains to hug the tire tightly, thereby preventing all the rattling noise, as is caused when other grips or chains are used.

Other objects and uses will appear in the following description.

In the drawings:

Figure 1 is a rear view showing a pair of driving wheels with pneumatic tires mounted on a driving axle, and my improved sectional grip chains or treads applied thereto and in operative position;

Fig. 2 is a side view showing an automobile wheel with wooden spokes and felly with a pneumatic tire mounted on the rim of the wheel, this figure showing the grip chains applied to the periphery of the tire after the several sections have been connected and linked together;

Fig. 3 is a side view of the upper portion of the wheel as shown in Fig. 2, showing a modification of my sectional grip chain;

Fig. 4 is a sectional view of the socket with screw eye inserted;

Fig. 5 is plan of a detached grip chain section, showing the central portion of same with the connecting ring in its proper position, the ends of the section being broken away or omitted;

Fig. 9 is a side view of an automobile wheel with wooden spokes and felly, with a detachable rim, with a pneumatic tire mounted on same, showing my sectional grip chains in their preferred construction applied to the periphery of the tire, and connected to the felly through the means of the tire bolts;

Fig. 10 is an edge view of the wheel shown in Fig. 9, looking in the direction of the arrow 1, showing the preferred construction of the grip chains when in position for active use;

Fig. 11 is a sectional view of a pneumatic tire mounted on a demountable rim, as shown in Fig. 9, showing the means of applying the screw eyes to the rim bolt;

Fig. 12 is a sectional view of the same parts as shown in Fig. 11, showing a modified method of fastening the ends of the sectional grip chains to the rim bolt and wedge;

Fig. 13 is a perspective view of the clip or fastening member, used on the inside of the rim bolt, for fastening the grip chains; and Fig. 14 is a perspective view of the clip or fastening member used on the outside of the rim bolt and wedge, to which the grip chains are fastened.

Similar reference characters indicate corresponding parts in all the views.

Figure 6:
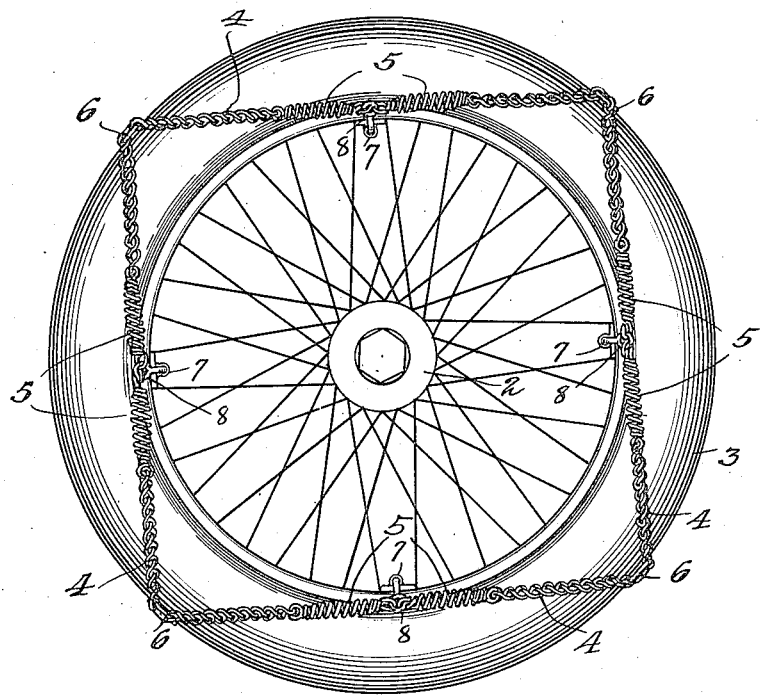
Fig. 6 is a side view of a wire wheel with a steel rim upon which is mounted a pneumatic tire, showing my sectional grip chains applied to the periphery of the tire and connected to the sockets and screw eyes which are attached to the rim of the wheel.

To further demonstrate the practicability of my invention, I have shown a rear axle 1, upon which are mounted a pair of wheels 2, with pneumatic tires 3, and upon these tires are placed my improved sectional grip chains consisting of chains 4, springs 5 and rings 6. These sectional chains are made up by taking two pieces of chains 4, and connecting them by placing one or more rings 6 through the links of each chain near the center, this arrangement forming a kind of an anti-skidding tread or shoe in the center of the chain, with the links of the chain encircled by the ring standing up edgewise providing a better gripping surface against side skidding than if the links were flat. At the four ends of these chains 4 are attached the springs 5, which are used to attach the sectional grip chains to the screw eyes 8 carried by the sockets 7, as applied to the felly or rim of the wheel. Each section of these grip chains is applied separately by first attaching two of the spring ends to the screw eyes 8 on the back of the wheel, then stretching the grip chains toward the front of the wheel and fastening the other two ends to the screw eyes 8, on the front of the wheel, continuing this process until the several sections are applied. This is very easily and quickly done, as the springs permit the hooks at their ends to snap into the screw eyes instantly, and they are tightly held in position on the tire, preventing all the rattling noise, as in other grip chains. In order to accommodate the different sizes of tires, it is only necessary to increase or decrease the length of the springs or chains, as may be required.

In applying my grip chains, it is not necessary to deflate the tire, but merely place the chains around the tire in its inflated or natural condition, attaching the hooks at the ends of the grip chains to the screw eyes, and pull the grip chains over the tread of the tire, which causes the springs to stretch and puts a tight tension on each section, holding it in position, as shown.

Figure 7:
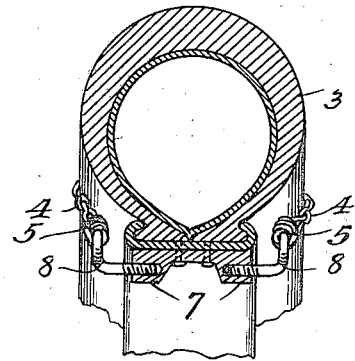
Fig. 7 is a sectional view of a tire mounted on a wire wheel with a steel rim, showing the application of the socket and screw eyes with the springs and a portion of the chains attached.
Figure 8:
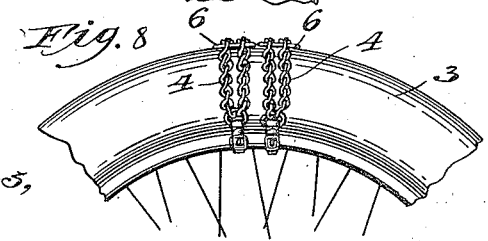
Fig. 8 is a side view of the upper portion of a wire wheel with pneumatic tire, showing grip chains applied in another manner, and used to cover a blowout hole when required for such purpose.

The sockets 7 and screw eyes 8 are made of cast steel or other suitable metal, and are fastened to the felly of a wooden wheel or to the rim of a wire wheel as shown in Figs. 2 and 7. It will be seen that these sockets and screw eyes form a connecting link for the several chain sections, which, however, are anchored and prevent the grip chains from moving longitudinally or laterally, but permit a slight rolling movement of that part of the chains, from their connection to the rings 6 to the eye in the end of the spring 5. When an automobile equipped with my grip chains is in motion, the springs 5 will automatically take up the slack in the chains caused by the weight of the automobile compressing the air in the tires; the grip chains are therefore always held tightly in position on the tire.

It will be seen that while these grip chains are applied in sections to the sockets and screw eyes, that the several sections can easily be disconnected from their fastenings to the screw eyes, and attached directly to each other, as in Fig. 3, and still have an effective flexible chain.

When it is necessary to apply these grip chains to a wire wheel, I have provided a different kind of socket 7, as shown in Figs. 6 and 7, which may be made in the form of a special casting or a steel plate bolted to the rim, as shown in Fig. 7.

There is another kind of wheel in use, called the demountable rim wheel, which has a varying number of bolts 9, nuts 10, and wedges 11, which afford a separate means for use in attaching my grip chains without boring into the felly or rim of the wheel to which some persons may object. To meet such conditions, I have provided for the use of the demountable rim securing bolts as supports for the screw eyes by simply drilling a hole in each end of the bolt, and threading it as shown in Fig. 11. I have also provided another kind of fastening, 12 and 13, for the grip chains, as shown in Figs. 13 and 14, which are made of sheet metal and formed into clips, one to be fastened under the bolt on the back of the wheel, and the other to be fastened under and around the wedge on the front of the wheel, the bolt passing through a hole in both of these clips, 12 and 13. This arrangement does away with the necessity of drilling a hole in the bolt and cutting a thread on same. It also dispenses with the screw eye 8, and may be found preferable on some makes of wheels.

It will be seen that these grip chains 4 may be used for other purposes, for instance, a tire may have a blowout, and no available means for repair is at hand; the chains can then be put to good use by placing them over the blowout, and fastening them around the tire and rim of the wheel by the means of a strap or piece of rope, and when the tire is inflated, the chains will hold the temporary repair securely. An extra grip chain should be carried for such purpose, as well as to replace a breakage, in which event, the broken section could be removed and the new section put on instantly and without any trouble, such as is necessary with other makes of grip chains; either the whole chain has to be removed and the broken pieces pried off with a tool and a new piece put on in its place, which also requires a tool to do the work and consumes a great deal of time and the job is a difficult one to do, or, if the broken chain is not repaired, the loose ends flop around and strike the fender and make a terrible noise with each revolution of the wheel, besides causing disfigurement of the fender.

Having thus described my invention, what I claim and desire to secure by Letters Patent is:

1. The combination with a wheel having a tire thereon, of a grip chain comprising a plurality of flexible tread members extending across and around the periphery of the tire, a plurality of resilient members carried by said flexible members, fixed socketed members on said wheel, and members adapted to be connected at one end with said resilient members and at their other ends with said socketed members to hold the tread members in place.

2. The combination with a wheel having a tire thereon, said wheel being provided with a plurality of sockets, of a grip chain for the tire comprising a plurality of flexible members extending across and bearing upon the periphery of the tire, a resilient member carried by each of said flexible members, and members carried by each pair of said resilient members and adapted to engage the sockets in the wheel to hold the flexible members in position.

3. The combination with a wheel having a tire thereon, said wheel being provided with a plurality of threaded sockets on each side thereof, of a grip chain for the tire comprising a plurality of flexible members extending across and bearing upon the periphery of the tire, a resilient member carried by each of said flexible members, and a threaded member adapted to engage each of said sockets and supported by each pair of said resilient members to hold the flexible members in position upon the tire tread.

In witness whereof I have hereto set my hand this 14th day of August, 1915.

WILLIAM J. BOYER.